United States Patent [19]
Hansen

[11] 3,889,810
[45] June 17, 1975

[54] APPARATUS FOR PICKING UP FILAMENTOUS OR LONG-FIBRED ELEMENTS FROM FLUID FLOWING THROUGH A CHUTE

[76] Inventor: Kaj Hansen, Osterbrogade 2, 4800 Nykobing Falster, Denmark

[22] Filed: Sept. 24, 1973

[21] Appl. No.: 399,704

[30] Foreign Application Priority Data
Sept. 25, 1972  Denmark............................ 4736/72

[52] U.S. Cl. ............................................... 209/76
[51] Int. Cl. ...................................................... B07c
[58] Field of Search ......... 209/76, 77, 78, 307, 308, 209/12; 198/198, 199, 177, 178

[56] References Cited
UNITED STATES PATENTS

| | | | |
|---|---|---|---|
| 1,791,365 | 2/1931 | Lien.................................... | 209/307 |
| 1,822,739 | 9/1931 | Lien.................................... | 209/308 |
| 3,621,997 | 11/1971 | Hobbs................................... | 209/76 |

FOREIGN PATENTS OR APPLICATIONS

| | | | |
|---|---|---|---|
| 235,670 | 3/1960 | Australia............................. | 198/198 |

OTHER PUBLICATIONS
Köllumann and Gruhn; "Krautfang–Apparate," Maschinen fabrik, Barmen, West Germany, 2 pp.

Primary Examiner—Allen N. Knowles
Attorney, Agent, or Firm—Brumbaugh, Graves, Donohue & Raymond

[57] ABSTRACT

Apparatus for picking up filamentous or long-fibered debris from fluid flowing through a chute has pulleys driving an endless reinforced rubber belt along a path. A first portion of the belt path extends above and substantially parallel to the chute and a second portion of the path extends upwardly about one pulley from the first portion of the path to a second pulley and downwardly about the second pulley to the first portion of the path. A rotatable rubber stop roller is positioned adjacent the second pulley at the downwardly extending portion of the belt path. Flexible scarfs are attached on one side to the belt at intervals along the belt. One end of a plurality of pick-up members is attached to the other side of the scarfs to form rows of pick-up members extending across the belt at the intervals of the scarfs along the belt, each member being swingably connected to the belt by the scarfs. As the pick-up members are carried by the belt along the first portion of the belt path, the pick-up members extend downwardly from the belt into the fluid for picking up debris from the fluid. The pick-up members carry the debris to the second pulley where the members swing on the scarfs relative to the belt to hit the stop roller to discharge the debris and then swing toward the belt to pass between the belt and the stop roller for returning to the first portion of the path.

11 Claims, 6 Drawing Figures

APPARATUS FOR PICKING UP FILAMENTOUS OR LONG-FIBRED ELEMENTS FROM FLUID FLOWING THROUGH A CHUTE

BACKGROUND OF THE INVENTION

The present invention relates to an apparatus for picking up filamentous or long-fibred materials from fluid flowing through a chute.

Apparatus of this type is used for picking up leaves, grass, straw, and like debris from a transport chute for root crops, e.g., sugar beets or potatoes, conveyed along the chute by water flowing through the chute. Known apparatus has two parallel endless chains connected at intervals with transverse shafts. A plurality of rigid, slat-shaped pick-up members are suspended mounted at one end on the shafts so as to be swingable about the shafts. The chains are passed over three sets of chain wheels, one of said sets being driven, so that the chains path of travel comprises three parts: an upwardly inclining part, a substantially vertically descending part, and a substantially horizontal part arranged in parallel with and above the transport chute. While travelling along the horizontal part the pick-up members hang down into the transport chute, where a number of tooth-shaped incisions in their front edges catch the light debris which is carried toward them in the upper part of the flow of water, whereas they may swing back and permit passage of heavy objects, such as roots, if the latter, which will normally be at the bottom of the chute, should enter the path of the pick-up members. Along the upwardly inclining part of the path of travel the pick-up members are conveyed with the free ends resting on transverse rods connecting the two chains, the tooth-shaped incisions with the collected debris turning upwards. When passing over the upper set of chain wheels the pick-up members swing through an angle exceeding 180° around the transverse shafts, and thereby strike against a stop by which means the collected debris is thrown off into an area separated from the transport chute, from where it may be removed in any suitable way. Thereupon the pick-up members are passed along the vertically descending part of the path of travel down to another passage through the transport chute.

Known apparatuses of this type present several disadvantages. For instance, they are exceedingly noisy and subject to heavy wear and corrosion, especially because the water in the transport chute may contain dissolved corroding impurities and as a rule will contain sand, which has a wearing effect on bearings in which the pick-up members are suspended from the shafts, as well as on bearings of the chain links and on the chain driving mechanism. A special disadvantage of the apparatuses of known construction is that they fail to work in frosty weather, because the bearings of the pick-up members and to some extent also the bearings of the chain links will be covered with ice and blocked. Furthermore, large objects, such as stones and beets, may wedge themselves between a pair of pick-up members and thus block the apparatus or deform the pick-up members or other components of the apparatus, which may cause fractures in the pick-up members. Finally, the pick-up members are exposed to fatigue fractures, because, when throwing off the collected debris, they are subjected to continual, heavy impact or shock in hitting the stop.

SUMMARY OF THE INVENTION

The present invention has for its object providing an apparatus of the said type, wherein the described disadvantages are avoided to the greatest extent possible by working at a reasonable noise level, functioning independent of the temperature of the surroundings, being highly resistant to wear and corrosion, avoiding the wedging of objects between the pick-up members, and, when the throwing off of the collected debris, does not cause fatigue fractures in the pick-up members. Furthermore, the apparatus is substantially more simple and less expensive to produce than apparatuses of known construction.

This object is obtained by means of the apparatus according to the invention, wherein the conveying device is a flexible reinforced rubber-belt conveyor, to which the pick-up members are swingably attached by means of flexible rubber scarfs.

By employing a rubber-belt conveyor with pick-up members scarfed thereto instead of a chain conveyor with hinged pick-up members, the noise level of the apparatus is substantially lowered, and at the same time blocking by icing up is avoided because the ice will break off when the flexible rubber is bent. Wear and corrosion will be virtually non-existent, except in the parts of the pick-up members which pass through the water flowing in the chute, i.e., where it is inherently inevitable. The resilient suspension of the pick-up members has the effect that they may also move to some extent transversely to the direction of belt movement so that the wedging of objects between them is avoided, and that the influences of impact or shock when throwing off the collected debris are reduced, part of the impact energy being absorbed by the rubber suspension. In the apparatus according to the invention the reinforced rubber belt employed may be any suitable conveyor rubber-belt obtainable on the market, and the scarfs with which the pick-up members are attached to the belt may be of the same or a similar material. The conveying device may otherwise be constructed on the basis of the components known in connection with rubber-belt conveyors and commercially available, e.g., motor pulleys. Thus, by constructing the apparatus according to the invention largely of components known per se and standardized in connection with use for other technical purposes, and which are therefore relatively low-priced, the efforts to simplify the production of the apparatus and to reduce the cost of production in comparison with corresponding apparatuses of known construction have been successful.

In one embodiment of the apparatus according to the invention the pick-up members consist of a hard material, such as steel, and each of them is provided with a head. This head serves to attach the pick-up member to the rubber scarf or scarfs.

In a second embodiment of the apparatus according to the invention the pick-up members consist of a resilient material, such as rubber, and may contain weighting means. In this way wear and corrosion in the pick-up members are reduced, and at the same time any risk of fatigue fractures therein is eliminated. The use of weighting means in the pick-up members ensures that in spite of the comparatively low specific gravity of the rubber the said members can be passed through the transport chute without swinging so far away from the vertical position as to become ineffective.

In still another embodiment of the apparatus according to the invention the pick-up members may be attached to the rubber scarfs with bolts or rivets. By these means a pick-up member can easily be detached from the scarf and exchanged in case of fracture or deformation. Such detachment is most easily effected by the use of bolts, whereas the use of rivets ensures against unintentional detachment. The rubber scarfs may be attached to the rubber belt correspondingly and with corresponding advantages.

In another embodiment of the apparatus according to the invention the pick-up members may be attached to the rubber scarfs by glueing or vulcanization. By these means the use of attachment members which may corrode is avoided. That is to say that the apparatus becomes still more useful for working in a heavily corrosive environment. A corresponding advantage is obtainable by attaching the scarfs to the rubber belt in the said way. When adopting glueing or vulcanization as the mode of attachment, the exchange of defective pick-up members will be made difficult, even if certain glueing procedures allow such exchange. As a rule it will therefore be expedient to make only one of the said attachments in this way.

Finally, according to one embodiment of the apparatus according to the invention the stop may be a rotatable roller which has a coat of or consists of thick rubber. By these means the influences of impact on the pick-up members and consequently the risk of fatigue fractures therein are further reduced. This measure also contributes to lowering the noise level, and is not detrimental to the effectiveness with which the collected debris is thrown off at the impact. In the rotatable arrangement the roller is exposed to less wear and tear, partly because the impacts are distributed over the whole of the circumference of the roller, and partly because the roller turns with the pick-up members, so that there will be no sliding to cause friction between the members and the roller.

DESCRIPTION OF THE DRAWINGS

The invention will now be explained in more detail, reference being had to the drawings, which illustrate embodiments of the apparatus according to the invention, and wherein.

DESCRIPTION OF THE PREFERRED EMBODIMENTS

Figure 1:
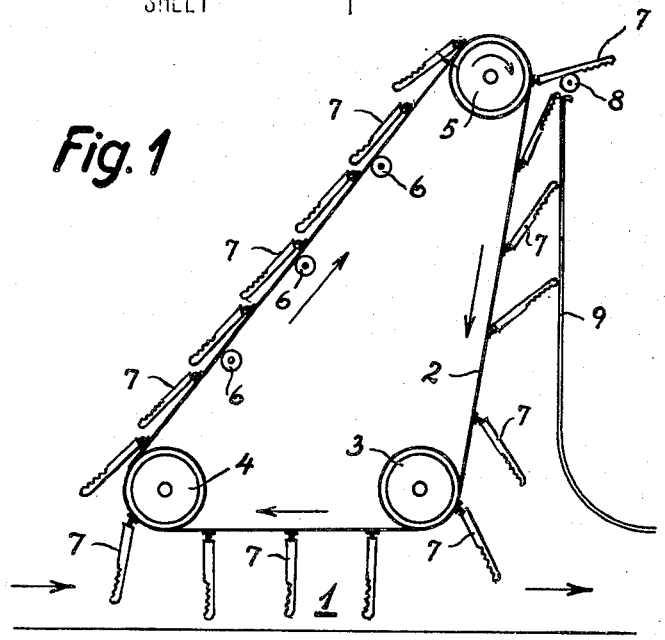
FIG. 1 is a schematical side view of the apparatus.

FIG. 1 shows the apparatus positioned above a transport chute 1 which is traversed by a flow of water carrying debris and roots in the direction shown by arrows. The apparatus consists of an endless, reinforced rubber belt 2 passing over two idler pulleys 3 and 4 and a motor pulley 5, which drives the belt 2 in the directions indicated by arrows, the belt 2 having a path between the pulleys 3 and 4 which is above and substantially parallel to the transport chute 1, and along which the belt 2 is driven in a direction contrary to that of the flow in the transport chute 1. Between the pulley 4 and the motor pulley 5 the belt 2 extends in an upwardly inclining direction, being supported on rollers 6 throughout this path. Between the motor pulley 5 and the pulley 3 the belt 2 extends downwards in an approximately vertical direction. On the outside of the belt 2 rows of pick-up members 7 are positioned at intervals transversely to the longitudinal direction of the belt 2, each of said rows consisting of a plurality of pick-up members 7 which are attached by means of bolts between rubber scarfs, as will be explained in the following.

An impact roller 8 is located approximately on a level with the peak of the belt 2 at the motor pulley 5 and at a distance from the belt 2 of an order of magnitude corresponding to half the length of a pick-up member 7, said impact roller 8 being rotatably mounted with its axis of rotation parallel to the axes of rotation for the motor pulley 5. The impact roller 8 is coated with or made of thick rubber. Below the impact roller 8 and extending approximately vertically downwards therefrom is a shield 9 which may be made of rubber or whose side facing the belt 2 may be coated with rubber. In another embodiment of the apparatus according to the invention, not shown, the roller 8 is placed at a distance from the belt 2 which is only slightly smaller than the length of a pick-up member 7. In the said embodiment the shield 9 has been omitted. The distance of the impact roller from the belt may be chosen so as to conform the apparatus to the environment in which the apparatus is to be used, and to the nature of the materials to be picked up. The pulleys 3 and 4, the motor pulley 5, the supporting rollers 6, the impact roller 8, and the shield 9 are mounted in known manner in a frame, not shown, which may, e.g., consist of welded structural-sections of steel placed in a known manner above the chute 1.

Figure 2:
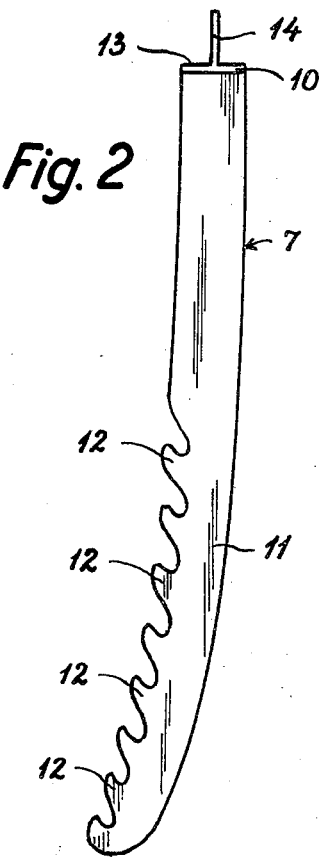
FIG. 2 is a side view of a pick-up member.
Figure 3:
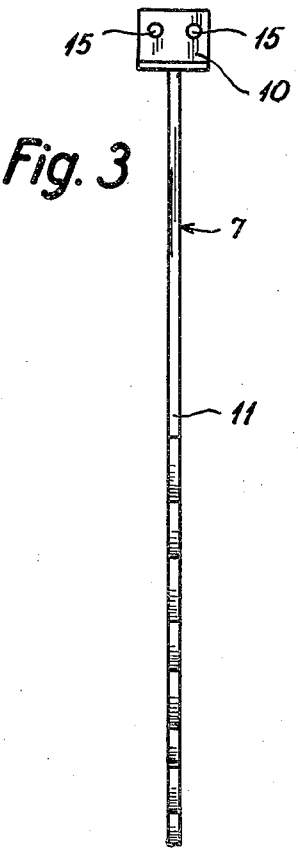
FIG. 3 is a front view of the pick-up member shown in FIG. 2.

Each of the pick-up members 7 consists of a head 10 and an arm 11, as shown in FIGS. 2 and 3. The arm 11 which may be cut from a steel plate may, as shown, have a slight curvature in the direction that is foremost during the movement of the arm at the end farthest removed from the head 10. On the part farthest removed from the head 10 the front edge of the arm 11 has a number of upward turning, serrated projections 12 over the active part of the length of the arm. The head 10 consists of an inverted T-section structure, whose transverse flange 13 is connected to the arm 11 by welding, so that the web 14 extends across the direction of motion of the pick-up member 7 in the apparatus. The web 14 has two bolt holes 15 for suspension of the pick-up member 7.

Figure 4:
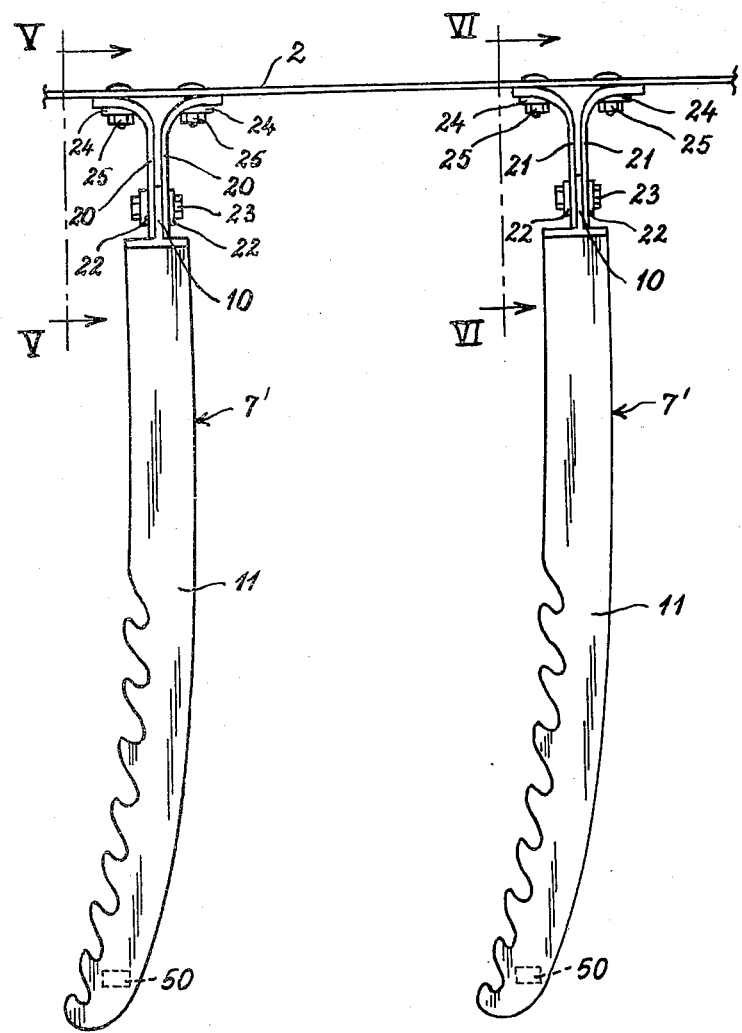
FIG. 4 shows two rows of different pick-up members suspended from the rubber belt, as seen from the side.
Figure 5:
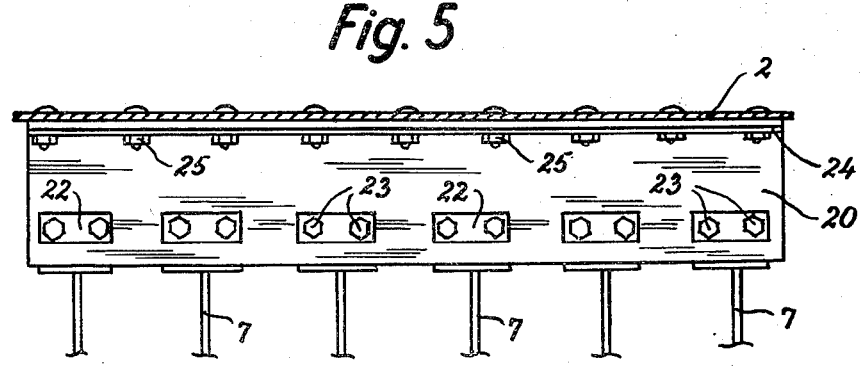
FIG. 5 is a section taken on the line V—V of FIG. 4.
Figure 6:
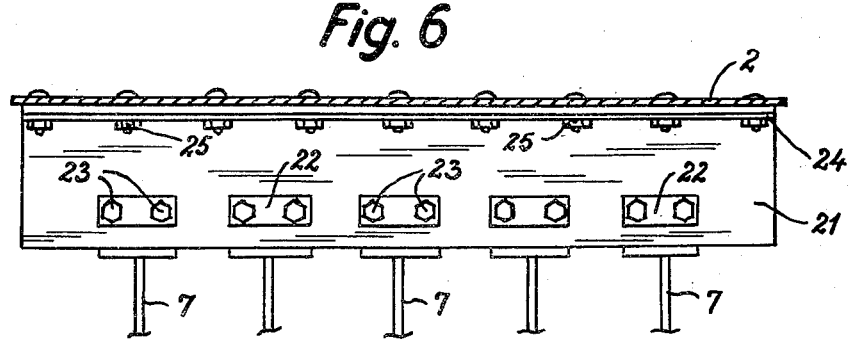
FIG. 6 is a section taken on the line VI—VI of FIG. 4.

FIG. 4 shows part of the belt 2 as seen from the side and with two consecutive rows of pick-up members 7', and FIG. 5 shows, as seen against the direction of motion of the belt 2, the suspension of the foremost of the rows shown in FIG. 4, whereas FIG. 6 correspondingly shows the hindmost row. The foremost row consists of six pick-up members 7', which are attached between two angular rubber scarfs 20 by means of bolts 23, which are tightened against washers 22 and passed through the bolt holes 15 in the head 10 of the pick-up member 7', said scarfs 20 extending approximately across the whole of the width of the belt 2 and being attached to the belt 2 by means of washers 24 and bolts 25. As shown in FIG. 5, the pick-up members 7 are spaced equidistantly in the row.

The hindmost row consists of five pick-up members 7', which as shown in FIG. 6 are placed in the middle of the spaces intervening between the pick-up members 7' in the foremost row, shown in FIG. 5, said members being attached in the same way between rubber scarfs 21, which are again attached to the belt 2. Throughout the length of the belt 2 the rows of pick-up members alternately consist of six and five pick-up members 7', attached as heretofore described.

The apparatus herein described operates as follows:

The motor pulley 5 drives the belt 2 and the pick-up members 7 attached thereto. Throughout the path between the pulleys 3 and 4 the pick-up members hang down into the transport chute 1 and are conveyed through the chute in the direction contrary to the flow of fluid. Thereby the serrated projections 12 on the arms 11 will catch and hold light debris such as leaves, grass, and straw carried in the flow of fluid, whereas the arms may swing to the rear and permit passage of bigger and heavier objects, such as beets, potatoes, and stones, and besides, on account of the resilience of the scarfs 20 and 21, the arms may be moved transversely to the direction of belt movement to such an extent that such objects cannot be wedged between the arms. The arrangement with alternately five and six pick-up members in the rows ensures an effective combing of the whole cross section of the chute. On account of the upward turning, saw-tooth shape of the projections 12, the debris collected on the members is held in the spaces between the projections 12 when the belt 2 passes over the pulley 4 to raise the members from the chute. The debris will also be held during the upward travel of the belt 2 on the inclined path from the pulley 4 to the motor pulley 5. When the belt 2 changes direction when passing over the motor pulley 5, the pick-up members 7 are flung against the impact roller 8 and abruptly stopped by same, whereby the collected debris is thrown off, the shield 9 preventing it from falling back into the transport chute 1. The shield 9, the form of which is only suggested in FIG. 1, may have any form serving the purpose. Thus, it may be formed as a wall of a receptacle for collecting the debris, or it may be formed as a transport device, e.g., a belt conveyor, for removing the debris. After having thrown off the collected debris, the pick-up members 7 roll over the roller 8, swing toward the belt, and in this way they enter the space between the belt 2 and the shield 9 extending from the belt opposite to the direction of belt movement. On the last part of the path between the motor pulley 5 and the pulley 3, the distance between the shield 9 and the belt 2 is larger than the length of the pick-up members 7, so they will swing on the rubber scarfs 20 and 21 to be vertically suspended when the belt 2 passes over the pulley 3.

Instead of using two scarfs 20 and 21, as shown and described, for the attachment of the pick-up members 7, a single scarf (not shown) can be used which is attached on one side to the belt and on the other side to the head of the pick-up member. Also, instead of forming the scarfs as plates continuing over the whole width of the belt, they can be divided into sections, which e.g. correspond to the width of the heads of the individual pick-up members. This may be done, e.g., by incisions in the scarfs. This arrangement substantially increases the transverse mobility of the pick-up members in the individual rows, which may be advantageous when objects are conveyed in the transport chute, which are more than normally liable to wedge between the arms of the pick-up members.

Instead of using bolts 23 and 25, as explained, for the attachment of the pick-up members to the scarfs and the attachment of the scarfs to the rubber belt, respectively, use can be made of rivets, or rivets can, e.g., be used for one and bolts for the other attachment, thus preserving the advantage connected with exchanging individual, defective pick-up members in a particularly easy manner. The said attachments can also be effected by glueing or vulcanizing, and, as explained in the foregoing, one attachment only can be by glueing or vulcanization and the other by means of bolts. Glueing and vulcanization offer several advantages. These means avoid the to use of such attachment members as bolts, rivets and washers, which may corrode, and if the scarfs are attached to the rubber belt in this way, the belt need not be perforated by bolt or rivet holes.

As shown in FIG. 4, the pick-up members may be made of a resilient material, such as rubber, instead of steel, as described with reference to FIGS. 1–3. The members are provided with weighting means 50. Such a material offers advantages in regard to avoiding damage to or fractures in the pick-up members, e.g., fatigue fractures, and using the apparatus in connection with transport chutes with a flow of highly corrosive fluids, which would make the use of pick-up members of steel impossible.

The embodiments of the apparatus according to the invention described in the foregoing are particularly intended for use in connection with transport chutes for conveying root crops, such as sugar beets or potatoes, from which chutes it is desired to remove light debris, such as leaves, grass, and straw, but the apparatus according to the invention is also suitable for a number of other applications, e.g., for picking up materials with characteristics similar to the described debris in industrial chemical operations or from chutes with flows of waste fluids, such as sewage or industrial discharge. The apparatus can be modified as described depending upon the application. In addition, the apparatus may be arranged with a number of pulleys other than three. For example, it may have the belt running over two pulleys, or as a square, over four pulleys.

I claim:

1. Apparatus for picking up filimentous or long-fiber debris from fluid flowing through a chute, comprising: an endless belt; at least two pulleys for driving the belt along a path, one portion of the path extending above and substantially parallel to the chute, the belt moving along the one portion in a direction contrary to the fluid flow through the chute, and another portion of the path extending upwardly from the first portion of the path about one pulley and downwardly about another pulley to return to the first portion of the path; a plurality of flexible scarfs at intervals along the belt; means attaching one side of the scarfs to the belt; a plurality of slat-shaped pick-up members spaced across the belt and adjacent each of the scarfs for forming rows of members across the belt at the intervals of the scarfs along the belt; means attaching the pick-up members to the other side of the scarfs for swingably suspending the pick-up members from the belt with the scarfs, the pick-up members extending from the scarfs into the fluid in the chute when the members are carried on the belt along the one portion of the path for picking up the debris from the fluid in the chute and carrying the debris to the downwardly extending portion of the path; and a stop member adjacent the other pulley at the downwardly extending portion of the path hit by the pick-up members for discharging the debris and swinging the members toward the belt for passing between the stop and the belt.

2. Apparatus according to claim 1 wherein the slat-shaped pick-up members have a T-section head having a web extending across the direction of belt movement.

3. Apparatus according to claim 1 wherein the slat-shaped pick-up members are resilient for avoiding fracture when they hit the stop.

4. Apparatus according to claim 1 wherein the means attaching the pick-up members to the scarfs are bolts or rivets.

5. Apparatus according to claim 1 wherein the means attaching the pick-up members to the scarfs is glueing or vulcanization.

6. Apparatus according to claim 1 wherein the means attaching the scarfs to the belt are bolts or rivets.

7. Apparatus according to claim 1 wherein the means attaching the scarfs to the belt is glueing or vulcanization.

8. Apparatus according to claim 1 wherein the stop is a rotatable roller coated with or consisting of thick rubber.

9. Apparatus according to claim 3 wherein the pick-up members have weighting means at an end opposite the end of the member attached to the scarfs for holding the members substantially vertically in the flowing fluid in the chute.

10. Apparatus according to claim 1 wherein the scarfs swingably suspend the pick-up members for movement both parallel to and transverse of the direction of movement of the belt.

11. Apparatus for picking up filamentous or long-fibered debris from fluid flowing through a chute, comprising: an endless reinforced rubber belt; three pulleys driving the belt along a path one portion of which extends above and substantially parallel to the chute between a first and a second of the pulleys, a second portion of which inclines upwardly from the first portion of the path between the second and a third of the pulleys, and a third portion of which extends substantially vertically downward to the first portion of the path between the third and the first of the pulleys, the direction of belt movement along the first portion of the path being contrary to the flow of fluid in the chute; a plurality of rubber scarfs extending substantially across the belt at intervals along the belt; means for attaching one side of the scarfs to the belt; a rotatable, rubber stop roller adjacent the third portion of the path at the third pulley; a plurality of slat-shaped pick-up members spaced across the belt at each of the scarfs; and means attaching one end of the pick-up members to the other side of the scarfs for swingably holding the pick-up members on the belt for movement both parallel to and transverse of the direction of movement of the belt, the pick-up members extending from the scarfs into the fluid in the chute when the belt holds the members in the first portion of the path for picking up debris from the fluid and swinging against the stop roller when the belt carries the member around the third pulley for discharging the debris, the pick-up members then swinging on the scarfs toward the belt for passing between the stop and the belt.

* * * * *

UNITED STATES PATENT AND TRADEMARK OFFICE
CERTIFICATE OF CORRECTION

PATENT NO. : 3,889,810
DATED : June 17, 1975
INVENTOR(S) : Kaj Hansen

It is certified that error appears in the above-identified patent and that said Letters Patent are hereby corrected as shown below:

Title Page, after "[21] Appln. No.: 399,704" insert the Assignee --Sukkerfabriken Nykoebing Limiteret--;

Col. 1, line 15, delete "suspended";

Col. 2, lines 6-7, "independent" should read --independently--;

line 10, after "when" delete "the" and delete "of";

Col. 6, line 15, after "the" delete "to".

Signed and Sealed this fourth Day of November 1975

[SEAL]

Attest:

RUTH C. MASON
Attesting Officer

C. MARSHALL DANN
Commissioner of Patents and Trademarks